United States Patent [19]

Kimball et al.

[11] Patent Number: 4,594,691
[45] Date of Patent: Jun. 10, 1986

[54] SONIC WELL LOGGING

[75] Inventors: Christopher V. Kimball, West Redding; Thomas L. Marzetta, Danbury, both of Conn.

[73] Assignee: Schlumberger Technology Corporation, New York, N.Y.

[21] Appl. No.: 593,932

[22] Filed: Mar. 27, 1984

Related U.S. Application Data

[63] Continuation of Ser. No. 335,758, Dec. 30, 1981, abandoned.

[51] Int. Cl.$^4$ .................... G01V 1/32; G01V 1/34; G01V 1/40
[52] U.S. Cl. ........................ 367/32; 367/26; 367/30; 364/422
[58] Field of Search ................ 367/26, 29, 30, 31, 367/32; 364/422

[56] References Cited

U.S. PATENT DOCUMENTS

| | | | |
|---|---|---|---|
| 3,330,375 | 7/1967 | White | 367/29 |
| 4,040,001 | 8/1977 | Vivet et al. | 367/26 |
| 4,114,721 | 9/1978 | Glenn, Jr. | 367/32 |
| 4,210,966 | 7/1980 | Ingram | 367/31 |
| 4,393,484 | 7/1983 | Buchanan et al. | 367/56 |
| 4,403,313 | 9/1983 | Garotta | 367/40 |

FOREIGN PATENT DOCUMENTS 2032105  4/1980  United Kingdom .

OTHER PUBLICATIONS

Stoffa et al., "Direct Mapping of Seismic . . . Decomposition", 3/81, pp. 255–267, Geophysics, vol. 43, #3, presented 11/79, at SEG mtg.
F. P. Kokesh et al., "A New Approach to Sonic Logging and Other Acoustic Measurements", Jour. Pet. Tech., vol. 17, No. 3, Mar. 1965.
M. P. Tixier et al., "Sonic Logging", Jour. Pet. Tech., vol. 11, No. 5, May, 1959.
Aron, J., Murray, J. and Seeman, B.: "Formation Compressional and Shear Interval-Transit-Time Logging by Means of Long Spacings and Digital Techniques," presented at the 53rd Annual Fall Technical Conference and Exhibition of the SPE, Oct. 1, 1978, Houston, Tex.
Stoffa, Paul L., et al.: "Direct Mapping of Seismic Data to the Domain of Intercept Time and Ray Parameter: A Plane Wave Decomposition," paper presented orally at 49th Annual Meeting of the Society of Exploration Geophysicists, Nov. 1979, New Orleans, La.
Kokesh, F. P. and Blizard, R. B.: "Geometrical Factors in Sonic Logging," Geophysics, vol. 24, No. 1, Feb. 1959.
Kokesh, F. P., Schwartz, R. J., Wall, W. B. and Morris, R. L.: "A New Approach to Sonic Logging and Other Acoustic Measurements," Jour. Pet. Tech., vol. 17, No. 3, Mar. 1965.
Hicks, W. G. and Berry, J. E.: "Application of Continuous Velocity Logs to Determination of Fluid Saturation of Reservoir Rocks," Geophysics, vol. 21, No. 3, Jul. 1956.
Wyllie, M. R. J., Gregory, A. R. and Gardner, G. H. F.: "Elastic Wave Velocities in Heterogeneous and Porous Media," Geophysics, vol. 21, No. 1, Jan. 1956.
Wyllie, M. R. J., Gregory, A. R. and Gardner, G. H. F.: "An Experimental Investigation of Factors Affecting Elastic Wave Velocities in Porous Media," Geophysics, vol. 23, No. 3, Jul. 1958.

(List continued on next page.)

Primary Examiner—Nelson Moskowitz
Attorney, Agent, or Firm—Cooper, Dunham, Clark, Griffin & Moran

[57] ABSTRACT

Disclosed is sonic well logging which gives good results both in open and in cased boreholes. New use is made of the energy content output from a multireceiver tool to find a coherence measure for the received sonic energy and to find the peaks of that coherence measure at each depth level so as to produce a number of new logs of parameters of those peaks. Examples are a slowness/time coherence log for those peaks, as well as new logs related to the arrival times of the coherent energy associated with the peaks and the energy attenuation for those arrival times.

39 Claims, 11 Drawing Figures

OTHER PUBLICATIONS

Tixier, M. P., Alger, R. P. and Doh, C. A.: "Sonic Logging," presented at the 33rd Annual Fall Meeting of Society of Petroleum Engineers in Houston, Tex., Oct. 5-8, 1958, and published in Petroleum Transactions, AIME, vol. 216, pp. 106-114, 1959.

Tixier, M. P., Alger, R. P. and Tanguy, D. R.: "New Developments in Induction and Sonic Logging," *Jour. Pet. Tech.,* vol. 12, No. 5, May 1960.

Morris, R. L., Grine, D. R. and Arkfeld, T. E.: "Using Compressional and Shear Acoustic Amplitudes for the Location of Fractures," *Jour. Pet. Tech.,* vol. 16, No. 6, Jun. 1964.

Pickett, G. R.: "Acoustic Character Logs and Their Applications in Formation Evaluations," *Jour. Pet. Tech.,* vol. 15, No. 6, Jun. 1963.

Willis, M. E. and Toksoz, N.: "Least Squares Velocity," Jan. 16, 1961 (this is believed to be a preprint of Automatic P & S Velocity Determination From Full Waveform Digital Acoustic Logs, Mass. Inst. of Tech., Cambridge, Mass., Jan. 16, 1981, an effort is being made to locate the printed paper).

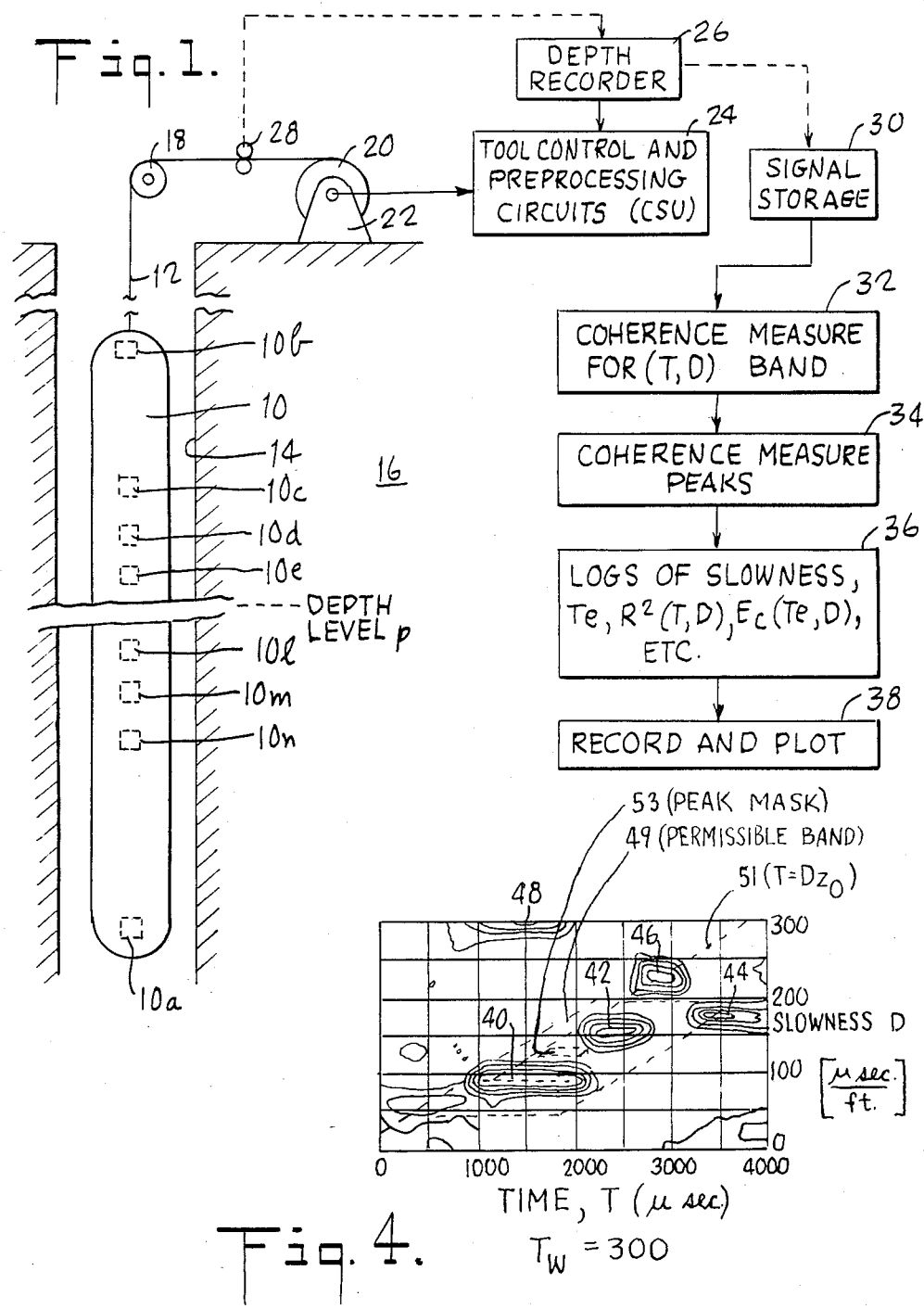

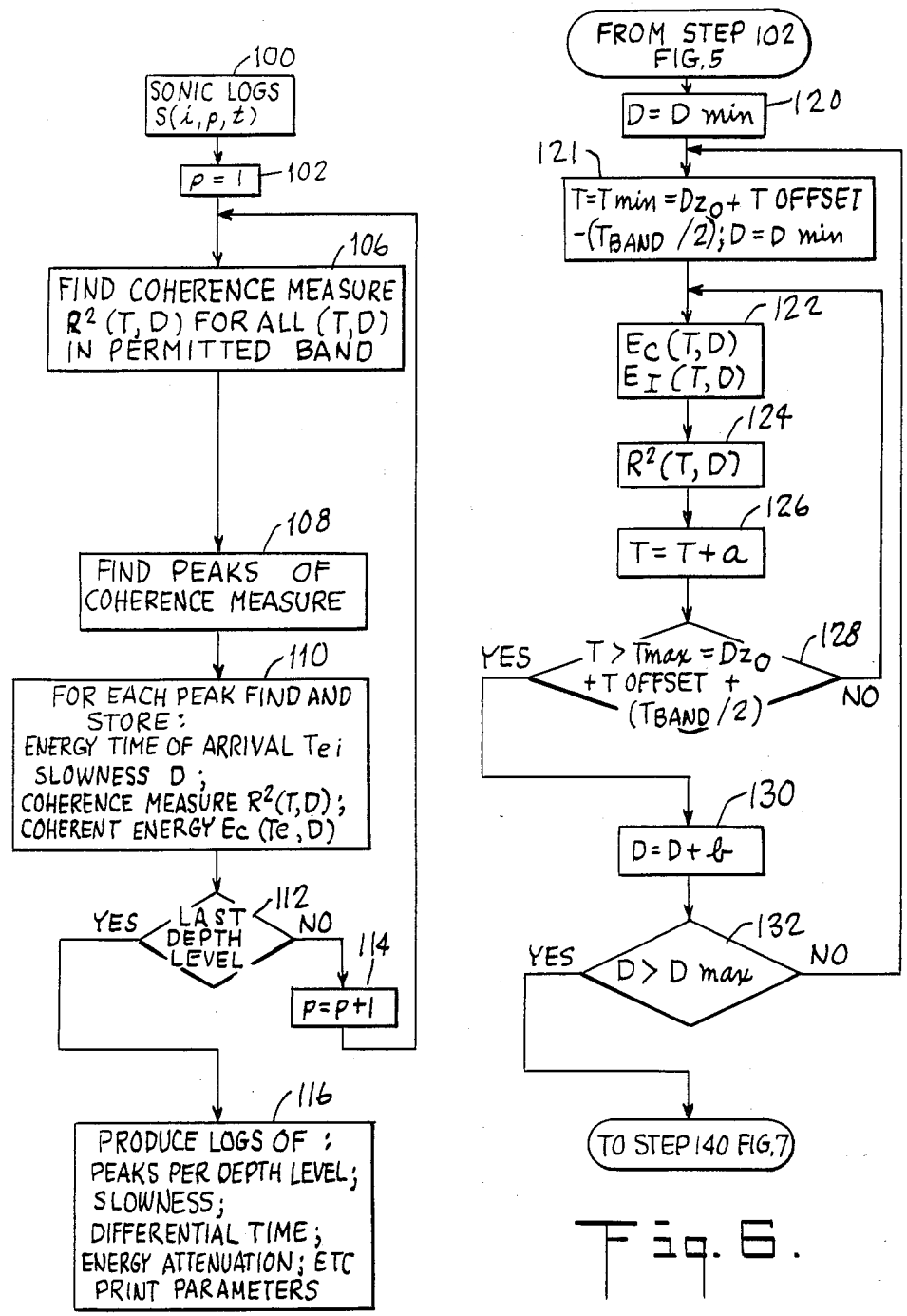

I(D,3)  INTEGER INDEX FOR SLOWNESS LINE 200 OF
        SLOWNESS D AT THE THIRD RECEIVER

F(D,3)  FRACTIONAL INDEX CORRESPONDING TO I(D,3)

NOTE:  I(D,1)=0  } THE SLOWNESS LINE ALWAYS
       F(D,1)=0  } GOES THROUGH THE SAMPLE POINT
                   AT THE FIRST RECEIVER

SONIC WELL LOGGING

This is a continuation of application Ser. No. 335,758, filed Dec. 30, 1981, now abandoned.

BACKGROUND AND SUMMARY OF THE INVENTION

The invention is in the field of well logging and relates particularly to a new kind of sonic logging which gives good results both in open and in cased boreholes and to utilizing such new kind of sonic logging to find subsurface parameters which are believed important in the search for and exploitation of hydrocarbons and other valuable underground resources.

Sonic well logs are typically derived from a tool suspended in a mud-filled borehole by a cable and taking sonic measurements every few inches (and for some tools—several times per inch) as it is slowly drawn up. Typically a sonic signal is transmitted from one longitudinal end of the tool and received at the other. The sonic signal from the transmitter enters the formation adjacent the borehole, and the arrival times and perhaps other characteristics of the receiver responses are used to find formation parameters such as the time required for a compressional soundwave to traverse one foot of formation. Typically the sonic speeds in the tool and in the drilling mud are less than in the formation and, accordingly, in uncased boreholes the first arrivals of sound energy at the receivers tend to correspond to sound-travel paths in the formation near the borehole wall. Sonic velocities in common formation lithologies tend to range from about 6,000 to about 23,000 feet per second but, to avoid small decimal fractions, the reciprocal of the velocity—slowness D—is typically recorded in microsec/ft over a typical range from about 44 microsec/ft for zero porosity dolomite to about 190 microsec/ft for water. A typical sonic log can be recorded on a linear scale of slowness versus depth in the borehole, and is typically accompanied by an integrated-travel-time log in which each division indicates an increase of one microsecond of the total travel time period. The integrated-traveltime log allows finding the travel time between any two depth levels by simply counting the divisions therebetween, and is useful for seismic purposes. Sonic logs are typically used as direct indications of subsurface properties or—in combination with other logs or other knowledge of the subsurface properties—to find subsurface porosity and other parameters which cannot be measured directly. In addition, it has been proposed to explore or exploit other properties of sonic signals in logging or other sound exploration of subsurface formations, and discussions related thereto can be found, as a nonlimiting example, in Aron, J., Murray, J. and Seeman, B.: "Formation Compressional and Shear Interval-Transit-Time Logging by means of Long Spacings and Digital Techniques", presented at the 53rd Annual Fall Technical Conference and Exhibition of the SPE, Oct. 1, 1978, Houston, Tex.; Stoffa, Paul L. et al: "Direct Mapping of Seismic Data to the Domain of Intercept Time and Ray Parameter: A Plane Wave Decomposition", paper presented orally at the 49th Annual Meeting of the Society of Exploration Geophysicists, November 1979, New Orleans, La.; Kokesh, F. P. and Blizard, R. B.: "Geometric Factors in Sonic Logging", *Geophysics,* Vol. 24, No. 1 February, 1959; Kokesh, F. P., Schwartz, R. J., Wall, W. B. and Morris, R. L.: "A New Approach to Sonic Logging and Other Acoustic Measurements", *Jour. Pet. Tech.,* Vol. 17, No. 3 March, 1965; Hicks, W. G. and Berry, J. E.: "Application of Continuous Velocity Logs to Determination of Fluid Saturation of Reservoir Rocks", *Geophysics,* Vol. 21, No 3 July, 1956; Wyllie, M. R. J., Gregory, A. R. and Gardner, G. H. F.: "Elastic Wave Velocities in Heterogeneous and Porous Media", *Geophysics,* Vol. 21, No. 1 January, 1956; Wyllie, M. R. J., Gregory, A. R. and Gardner, G. H. F.: "An Experimental Investigation of Factors Affecting Elastic Wave Velocities in Porous Media", *Geophysics,* Vol. 23, No. 3 July, 1958; Tixier, M. P., Alger, R. P. and Doh, C. A.: "Sonic Logging", *Jour. Pet. Tech.,* Vol. 11, No. 5 May, 1959; Tixier, M. P., Alger, R. P. and Tanguy, D. R.: "New Developments in Induction and Sonic Logging", *Jour. Pet. Tech.,* Vol. 12, No. 5 May, 1960; Morris, R. L., Grine, D. R. and Arkfeld, T. E.: "Using Compressional and Shear Acoustic Amplitudes for the Location of Fractures", *Jour. Pet. Tech.,* Vol. 16, No. 6 June, 1964; Pickett, G. R.: "Acoustic Character Logs and their Applications in Formation Evaluations", *Jour. Pet. Tech.,* Vol. 15, No. 6 June, 1963; and Willis, M. E. and Toksoz N.: "Automatic P & S Velocity Determination From Full Waveform Digital Acoustic Logs", Massachusetts Institute of Technology, Cambridge, Mass., Jan. 16, 1981.

Prior art sonic well logging tends to give good and highly useful results in open (uncased) boreholes but not in cased boreholes. Indeed, no known prior art technique is known to give good sonic logs in cased boreholes despite the long standing need therefor, e.g., in cases where a sonic log run prior to casing turns out to be defective or not as good as later possible with earlier unavailable tools or techniques, or where no acoustic log was run at all prior to casing.

Accordingly, the invention provides a method and a system for acoustic logging which is successful both in open and in cased boreholes and which makes use of received sonic signal components which are not believed to have been successfully exploited for such purposes in the past and which give valuable clues of the nature of the subsurface formation. In accordance with the invention, new types of logs are produced, such as a slowness/time coherence log, and logs of other parameters associated therewith. The invented method and system are particularly useful with sonic logs derived from a tool in which the sonic receivers are close to each other—as a nonlimiting example, when the receivers are a foot or less from each other, and preferably less than half wavelength of the sonic signal (e.g., about six inches) from each other.

In a particular and nonlimiting embodiment, the invention starts with sonic logs which are records of the receipt, at successive borehole depth levels, of sonic signals by receivers which are spaced along the length of a borehole tool from each other and from at least one transmitter of sonic signals which is also carried by the same tool. These sonic logs are analyzed to find whether they include an arrival of sonic energy at time T and slowness D for all (T,D) combinations which have been found to be reasonable in practicing the invention. The measure of interest which is derived from these (T,D) combinations in accordance with the invention is called a coherence measure and is designated $R^2(T,D)$. It corresponds to a measure sometimes called "semblance" in seismic work. It has been discovered that for each given depth level z in the borehole, the surface made up of the found measures of coherence for (T,D) combinations tends to have peaks corresponding to the different components of the sonic signal arriving at the tool receivers, e.g., the compressional, shear and Stoneley components. It has also been discovered that the arrival time and slowness associated with these peaks have unexpectedly significant relationship to the subsurface formation and that, accordingly, new logs associated with parameters of those peaks can be produced which give significant clues to the subsurface formation. As a nonlimiting example, one such new log is a log of the slowness associated with those peaks versus depth of the borehole. Another is a log of the arrival time associated with such peaks versus depth in the borehole or, for convenience of visual presentation, the difference between the arrival time of the coherent energy associated with a peak and the travel time thereof to the first receiver at the slowness associated with the peak. Yet another is a log of the received coherent energy associated with a peak or, for convenience of visual presentation, the attenuation of such energy in travelling from the transmitter to the receivers. Yet another can be the Poisson's ratio found from the slowness at each depth.

In a typical known prior art system the first sonic energy arrival at a receiver is generally assumed to be the compressional wave (P-wave) which has travelled from the transmitter to the receiver through the formation adjacent the borehole, the second arrival is generally assumed to be the shear wave and, if there is a subsequent arrival, it is generally assumed to be the Stoneley wave. In a cased borehole the P-wave is typically preceded by the arrival of the sonic wave travelling along the casing. However, it is not always true that the sonic energy arrives in the assumed order, and significant errors may be introduced if the incorrect initial assumption is made. In contrast, in the technique according to the invention the decision as to the significance of the received sonic energy is made on the basis of the entire waveform received by each of a number of receivers rather than on the basis of an initial assumption as to the significance of a portion of the waveform received at a particular receiver. In addition, a typical known prior art system relies on the difference in the time of arrival as between two receivers, and an error in any one of them may seriously affect the accuracy of the overall result. In contrast, in a system according to the invention reliance is placed on the synergistic combination of the energies received at many receivers, and an error in a minority of them is unlikely to seriously affect the accuracy of the system. Still in addition, a typical known prior art system relies on a pair of receivers spaced a couple of feet apart, with attendant limitations on vertical resolution, while in a system according to the invention the receivers are typically spaced from each other by a distance less than half the wavelength of the sonic signal from the transmitter (e.g., six inches apart), thereby significantly improving vertical resolution and reducing aliasing errors. Additional advantages of the invented process and system will become apparent from the detailed description below.

BRIEF DESCRIPTION OF THE DRAWINGS

FIG. 1 is an overall schematic illustration of a well logging system making use of an exemplary embodiment of the invention.

FIG. 4 is an exemplary map, in slowness versus time-of-arrival space, and with a time window of 300 microseconds, showing the contours and peaks of a coherence measure at a given borehole depth level.

FIG. 5 is an overall flow chart illustrating an exemplary embodiment of the invention.

FIG. 6 is a flow chart detailing a process for finding the coherence measure used to form a map similar to that shown in FIG. 4.

DETAILED DESCRIPTION

Figure 3:
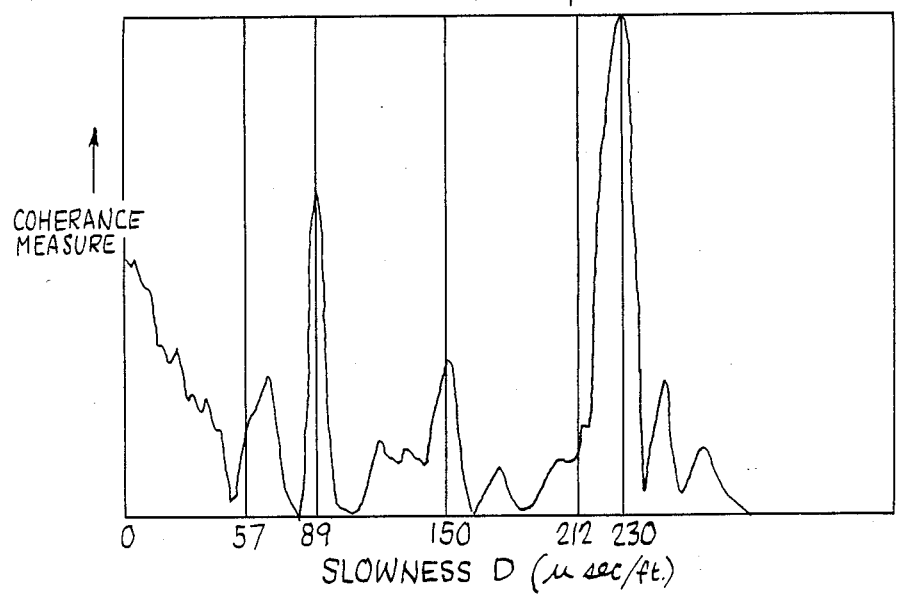
FIG. 3 is a plot of a coherence measure versus slowness in microsec/ft, with time given by $T = Dz_o$.

Referring to FIG. 1 for an overall schematic illustration of a well logging system making use of the invention, a sonic tool 10 is lowered on an armored multiconductor cable 12 into a borehole 14 to take sonic logs of a subsurface formation 16. Tool 10 is adapted for movement up and down borehole 14, and includes at least one sonic transmitter 10a (and can include a second sonic transmitter 10b), and a number of sonic receivers, for example twelve receivers 10c through 10n. The receivers are spaced along the length of tool 10 from each other and from the transmitter(s), and preferably the distance between each transmitter and the receiver closest thereto is much greater than the inter-receiver distance. For example, the distance between the transmitter and the receiver nearest thereto is in the range of 5–25 feet (e.g., 13 feet) and the inter-receiver distance is less than half a wavelength of the sonic signal from the transmitter—for example about a foot or, preferably, about half a foot. As tool 10 is drawn up slowly; and preferably steadily, up borehole 10, transmitter 10a periodically generates a sonic signal a part of which passes through paths other than in tool 10 (including paths through formation 16) and is received by each of receivers 10c through 10n. Cable 12 goes to a sheave wheel 18 at the surface and then to a suitable drum and winch mechanism 20 which raises and lowers tool 10 in borehole 14 as desired. Electrical connection between transmitter 10a (and 10b) and receivers 10c through 10n on the one hand and surface equipment on the other hand, is made through suitable multi-element slipring and brush contact assembly 22 associated with the drum and winch mechanism 20. A unit 24 contains tool control and pre-processing circuits designated SU which send electrical signals to tool 10 and receive other electrical signals (sonic logs) therefrom via cable 12 and assembly 22, and cooperate with a depth recorder 26, which in turn derives depth level signals from depth measuring wheel 28, so as to associate the signals from receivers 10c through 10n with respective depth levels z in borehole 14. The outputs of sonic receivers 10c through 10n, after optional pre-processing in unit 24, are sent to signal storage 30, which can also receive signals from or through depth recorder 26 so as to associate sonic receiver outputs with respective depth levels z in borehole 14. Storage 30 can store the outputs of sonic receivers 10c through 10n in analog form but more typically stores them in the form of digital sonic log measurements, a set for each respective depth level z, derived by digitizing such analog signals, for example in unit 24. Storage 30 can comprise a magnetic storage device, such as disc or tape, and/or other storage media such as semiconductor or equivalent memory circuits. In the case of a tool 10 having twelve receivers, twelve respective waveforms of 1,024 digitized measurements each can be produced for every three inches of borehole, which translates to many millions of digitized log measurements (samples) for the typical borehole which is several thousand feet deep, and storage 30 should have capacity appropriate for the task of storing twelve sonic logs, each from a respective one of receivers 10c through 10n and each comprising, in this example, 1024 log samples for every three inches of borehole.

The sonic logs stored at 30 are thereafter transferred to a unit 32 which finds, for each relevant depth level z in borehole 14, a respective coherence measure for the combinations of time of arrival T of the sonic signal at the first receiver and the slowness D characterizing the travel of that signal from the transmitter to the receiver, but—for the sake of speeding up the process—only within a band of (T,D) combinations which are likely to be relevant. At unit 34 the coherence measure peaks for each relevant depth level are found, and at unit 36 a number of new logs are derived on the basis of the peaks found in unit 34. Those logs include, without limitation, a slowness log (also referred to as slowness/time coherence log), a log of the arrival time of the energy associated with a peak, a log of the coherence measure associated with the respective peaks, a log of the coherent energy associated with the respective peaks and possible other logs. Unit 30a records and/or plots one or more of the new logs and/or other parameters associated with the logging process and/or the logs. Units 32 through 38 can be respective subsystems of a digital computer of a suitable size and configuration, having suitable peripheral equipment, and arranged to carry out the invented process, such as a machine commercially available under the designation VAX 780/VMS, or all or a part of said units can be implemented as a special purpose hard-wired or firm-wired computer with suitable peripheral equipment. Signals can be transmitted between the units indicated at FIG. 1 directly, by means of cable, or by other means such as a radio or other data link or by means of physically transporting from one unit to the next a record medium containing the requisite signals.

Figure 2:
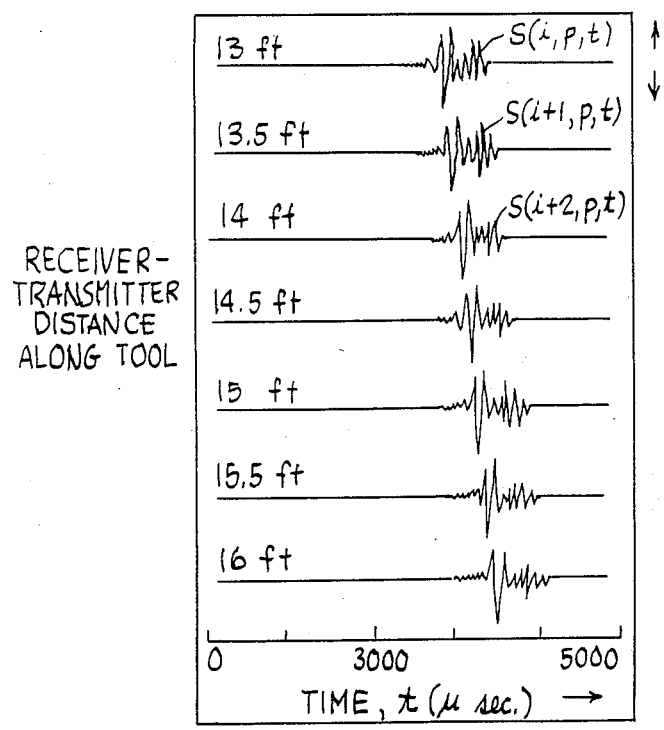
FIG. 2 illustrates the waveforms of sonic signals received at a set of sonic receivers spaced from each other along the length of a sonic tool and from a transmitter carried by the same tool.

The response of any given one of receivers 10c through 10n to a sonic signal from transmitter 10a (or 10b) is typically a waveform of the general type illustrated in FIG. 2, and the responses of the several receivers are staggered in time due to the different spacing of the receivers from the transmitter. For example, if the first of seven receivers is spaced 13 feet from the transmitter and each successive receiver is at a half foot increment from the preceding one, the respective responses can conform to the model waveform illustrated in FIG. 2 on a scale of time from the transmitted signal and an unmarked vertical scale of signal level from the given receiver. The topmost waveform is designated $s(i,z,t)$, to indicate that it is a part of the sonic log from receiver i for depth level z in the borehole and varies with time t as indicated. The second waveform from the top is designated $s(i+1,z,t)$, to indicate that it is from the next sonic receiver for the same depth level z and similarly varies with time t as indicated, etc. In the case of a formation in which a transmitted sonic pulse $p(t)$ travels undistorted between the transmitter and the i-th receiver at a slowness D, and where the distance between the transmitter and the receiver along the borehole axis is $z_i$, the waveform can be represented by:

$$s(i,z,t) = p(t - Dz_i) \qquad (1)$$

and the moveout of the pulse along the line of receivers can be linear with distance. Under this idealized condition, the time of arrival T at the receiver closest to the transmitter (separated from it by a distance $z_o$) can be proportional to the slowness at which that pulse travels, i.e.:

$$T = Dz_o \qquad (2)$$

Expression (2) above describes a relation between time of arrival T and slowness D which can hold for an ideal homogeneous medium, and is illustrated graphically as line 51 in FIG. 4. In many instances arrivals move out linearly across the string of receivers, yet do not obey this relationship exactly because of inhomogeneities between the transmitter and first receiver. Consequently, the time of arrival T and the slowness D can be only weakly dependent.

The responses of receivers such as 10c through 10n to a sonic signal from a transmitter such as 10a can be converted in accordance with the invention to a coherence measure based on the ratio of the coherent and total energies received thereby. A plot of such coherence measure is illustrated in FIG. 3. It can be observed in the particular example of FIG. 3 that the following arrivals of sonic signals are indicated: compressional at about 89 microsec/ft, shear at about 150 microsec/ft and Stoneley at about 230 microsec/ft. In addition, a casing component may be indicated by the peak between the 57 and 89 microsec/ft marks, and fluid mode arrivals may be indicated by the peaks between the 150 and the 230 microsec/ft marks.

It has been discovered in making this invention that such a coherence measure of the response of a number of sonic receivers arranged in a certain manner with respect to each other and with respect to the transmitter of the sonic signal, can indeed be used in the invented manner as a good measure of the nature of the formation around both open and cased boreholes. An exemplary coherence measure which has been found useful for the purpose is a measure of the presence of the arrival of a sonic signal at a specified starting time T and slowness D and can be, in the particular exemplary embodiment discussed herein, the ratio of the coherent (or stacked) energy $E_c(T,D)$ and the total energy $E(T,D)$ received by sonic receivers 10c through 10n. For convenience, this ratio can be normalized to the number of sonic receivers M, which in the case discussed herein is twelve:

$$R^2(T,D) = \frac{1}{M} \frac{E_c(T,D)}{E(T,D)} \qquad (3)$$

The coherent (or stacked) energy can be thought of as the energy which is received in time alignment with the starting time T and the slowness D by the several sonic receivers when the spacing therebetween is accounted for. For a particular depth level and a particular combination of arrival time T and slowness D, when found for a particular time window width $T_w$ in small steps of t, the coherent energy $E_c$ can be represented as follows, where s(i,t) refers to the sonic response, varying with time t, of a receiver identified by the index i, and the terms $(z_i - z_0)$ refers to the difference, in distance along the borehole axis from the transmitter, between the position of sonic receiver i and the sonic receiver closest to the transmitter:

$$E_c(T,D) = \int_0^{T_w} \left| \sum_{i=0}^{M-1} s(i,t + [T + D(z_i - z_o)]) \right|^2 dt \quad (4)$$

The total energy E(T,D) can be similarly represented as follows, where the terms have the same meaning and where the difference from expression (4) is mainly in that expression (4) calls for summation over the signed levels of the sonic log response while expression (5) calls for a sum over squared levels:

$$E(T,D) = \int_0^{T_w} \sum_{i=0}^{M-1} \left| s(i,t + [T + D(z_i - z_o)]) \right|^2 dt \quad (5)$$

It can be observed that for any given set of sonic logs from a respective set of sonic receivers on a tool, the coherence measure level should be between zero and one, and that when it approaches one this indicates the presence of an arrival at time T and slowness D. A rule of thumb can be that coherence levels greater than 2/M tend to indicate the presence of an arrival. In practicing this invention levels of the coherence measure in excess of 0.9 have been commonly obtained.

For a given depth level in the borehole the coherence measures discussed above can be indicated on a map of coordinates in time T in microseconds and slowness D in microsec/ft to give a plot of the general type illustrated in FIG. 4, where the shown contours are isovalues of the coherence measure. It can be observed in FIG. 4 that there appear to be four distinct ridges corresponding to four arrivals: the compressional arrival designated 40, two shear arrivals designated 42 and 44 and a Stoneley arrival designated 46. A half ridge is visible at 48 and is likely to be an alias of the compressional arrival.

The plot of FIG. 4 has been produced on the basis of a time window $T_w$ (referred to in connection with expressions (4) and (5)) being set at 300. If this time window is small (e.g., 10 microseconds) the coherent and total energies tend to vary sinusoidally at twice the frequency of an arrival at slowness D. This tends to lead to sinusoidal variations in the coherence measure derived on the basis of such a small time window and produces serrated ridge edges. Although the serrations resulting from choosing a small time window can contain some frequency information about the arrival, they also tend to confuse the plot and, consequently, the time window in practicing the invention is usually selected so that it spans more than one cycle of the lowest frequency sinosoid expected. As a nonlimiting example, a time window of 500 microseconds has been found satisfactory over a variety of sonic logs in practicing the invention.

While a contour plot such as that illustrated in FIG. 4 can be said to provide an accurate indication of the nature of the formation at the borehole depth level of interest, it can be inconvenient to show such a plot at each of tens of thousands of depth levels for a given borehole. For this and other reasons, in accordance with the invention the peaks in coherence (such as those indicated at 40, 42, 44 and 46 in FIG. 4) are found for each depth level of interest, and new logs are produced based on parameters of such peaks. At least two factors make peak finding nontrivial: small local variations in the coherence measure and aliases. In view of these factors, and for other reasons as well, such as the need to speed up the process, a search for peaks is made only in a certain selected band of the time-slowness space, and a carefully selected definition of a peak is used. In addition, in accordance with the invention aliases are countered by spacing the sonic receivers closely, for example half a foot or a foot from each other.

Accordingly, one technique of assuring that valid peaks in the coherence measure are likely to be found is to constrain their location in the slowness-time space to what has been discovered to be values of T and D which are reasonably likely to be relevant. Since the coherence measure need not be found at all for the (T,D) combinations which are not checked for peaks, this has the additional advantage of reducing the overall signal processing effort. As an example, the range of slowness can be restricted to bounds within arrivals which are commonly expected—e.g., values of 40 to 190 microsec/ft are suitable for locating compressional and shear arrivals, and values of 40 to 250 microsec/ft are suitable for locating fluid mode arrivals as well. In addition, the arrival times T for each slowness D can be limited to values discovered to be of likely relevance in practicing this invention—for example, the only times T for a given slowness at which a peak will be looked for can be limited to those between a minimum time TMIN and a maximum time TMAX found in accordance with the expression below, where, in one particular example the value of $T_{BAND}$ can be 1,500 microseconds and the value of $T_{OFFSET}$ can be 500 microseconds, and where $z_0$ designates the distance along the borehole axis between the transmitter and the receiver closest to it:

$$TMIN = [Dz_0 + T_{OFFSET}] - \frac{T_{BAND}}{2} \leq T \leq \quad (6)$$

$$[Dz_0 + T_{OFFSET}] + \frac{T_{BAND}}{2} = TMAX$$

The band in which peaks of the coherence measure can be found is therefore limited to a line on T which is 1,500 microseconds wide and moves diagonally up and to the right in a plot such as that illustrated in FIG. 4. Such a line on T inscribes, as one example, the rhomboid 49 shown in broken lines in FIG. 4.

Once a coherence measure is found as discussed in connection with expressions (3), (4) and (5) for each of the combinations of arrival time T and slowness D within the band discussed in connection with expression (6), in order to construct the equivalent of a map of the type illustrated in FIG. 4 for a given borehole depth level z, a search is made for peaks in the coherence measure by a process which is optimized in that successive searches are made for peaks in masks much smaller than the band discussed in connection with expression (6) and in that a coherence measure is considered to be a peak if, and on by if, it is greater than both a selected minimum level and all other coherence measures within the mask. Such a peak mask is illustrated graphically as a rhomboid 53 in FIG. 4. The time ans slowness limits of the peak mask used for testing whether the coherence measure at a given (T,D) point in the map is a peak can be defined as follows, where a typical value of $T_{MASK}$ and $D_{MASK}$ can be 600 microseconds and five microsec/ft respectively, and where T* and D* define the time and slowness of points within the mask;

$$T - \frac{T_{MASK}}{2} \leq T^* \leq T + \frac{T_{MASK}}{2} \quad (7)$$

$$D - \frac{D_{MASK}}{2} \leq D^* \leq D + \frac{D_{MASK}}{2} \quad (8)$$

The coherence value at a given point in a map such as that of FIG. 4 is selected as a peak only if it both exceeds a minimum value n and exceeds the coherence measure at every other map point within the mask, or, stated differently, as follows:

$$R^2(T,D) > n \quad (9)$$

$$R^2(T,D) > R^2(T^*,D^*) \quad (10)$$

The threshold on coherence n can be taken as 2/M, where M is the number of sonic receivers on the tool. Peaks at points (T,D) on the map satisfying this definition are both above the threshold n and above all their neighbors within the peak mask centered on the particular (T,D) point. Where in some instances points (T*,D*) within the peak mask are outside the band discussed in connection with expression (6), the coherence measure $R^2(T^*,D^*)$ for such point is taken to be zero.

Note that the coherence measure is not dependent solely on the arrival energies but on the ratio of coherent to incoherent arrival energies. Consequently, the times T for the points at which the coherence measure is a peak do not usually indicate the location of the energy in an arrival but rather the time of greatest coherence. Accordingly, for use in deriving an attenuation log in accordance with the invention and for other reasons, the time of arrival for the energy $T_e$ associated with each given peak is found as follows. Suppose (T,D) defines a point in a map such as that shown in FIG. 4 at which a peak has been found as discussed above. Define $T_e$ as that value of T* for which $E_c(T^*,D)$ is a maximum for all values of T* defined by expression (7). Stated differently, for all T* across the relevant peak mask at the slowness D of the relevant peak of the coherence measure found as discussed above:

$$E_c(T_e,D) \geq E_c(T^*,D) \quad (11)$$

The time $T_e$ resulting from carrying out this secondary procedure has been discovered in practicing this invention to agree well with the perceived start of the arrival energy in the first waveform.

Thus, in carrying out this embodiment of the invention, a map similar to that illustrated in FIG. 4, or the equivalent thereof, is constructed for each relevant depth level in the borehole, and the coherence measure peaks within each map are found as discussed above. A tangible record of the results can be produced by plotting a new log designated slowness/time coherence log which shows the slowness D increasing to the right versus depth in the borehole increasing vertically down. If typically four peaks are found per depth level, this will give four curves. Additionally, each point on a curve can be coded to produce a gray scale representation of the value of the associated coherence measure, i.e., the larger values of the coherence measure can be made to yield a darker mark on the plot, to allow a user to observe both the slowness and the relative coherence measure for each peak found as a function of depth.

An additional tangible representation can be produced in accordance with the invention of the energy time-of-arrival for each peak as a function of depth in the borehole, e.g., again in the form of a log trace on a suitable record medium, or in the form of another type of tangible record. Rather than plotting $T_e$ directly, which would require a wide strip of log, the differential time of arrival can be plotted, which is the time difference between the arrival and the slowness-time line defined by expression (2) above. Stated differently, the differential time of arrival for a given peak is the difference between the energy time of arrival $T_e$ for a given peak and the time of arrival derived by multiplying the distance from the transmitter to the first receiver by the slowness of arrival of that energy to the first receiver, i.e.:

$$dT_e = T_e - Dz_o \quad (12)$$

The differential time of arrival $dT_e$ is a measure of how closely the arrival time corresponds to the measured slowness for that arrival, and is a convenient indication of the effects of thin beds and an important diagnostic aid in recognizing the presence of aliases. Still in addition, a tangible representation can be produced in accordance with the invention of the coherent energy for each peak, $E_c(T_e,D)$, e.g., in the form of a log trace plotted on a record medium, preferably after conversion to an "attenuation" measure A for more convenient visual presentation. The resulting A log is not a true attenuation measurement, but is nevertheless some measure of how well sonic energy travels from the transmitter to the receivers. The plotted A log in decibels can be given by:

$$A = K_A - 10 \, log_{10}[E_c(T_e,D)], \quad (13)$$

where $K_A$ is a gain constant dependent on the sonic transmitter power levels, receiver gains and and the spreading model assumed for a given borehole. A convenient "attenuation" measurement is in decibels above cylindrical spreading, i.e., beyond 1/z losses in energy. Different choices in $K_A$ result in a shift of the "attenuation" log curve horizontally but not in a change in its shape.

Still in addition, a tangible record can be produced in accordance with the invention of the Poisson's ratio from the slowness found at each depth.

An exemplary process embodying the invention is illustrated in FIG. 5 in generalized flowchart form, and starts at step 100 with the sonic logs generated from the receivers of a multi-receiver tool such as that illustrated at 10 in FIG. 1. The sonic logs are designated s(i,z,t) indicating that: there is a respective log i for each respective receiver carried by the tool; that each log has a respective measurement for each respective depth level z in the borehole; and that these measurements vary as a function of time t, e.g., in the manner illustrated in FIG. 2. At step 102 the lowermost depth level in the borehole depth interval of interest is selected. At step 106 the coherence measure is found for each (T,D) combination in the band of permissible combinations, e.g., in accordance with the process discussed in connection with expressions (3), (4), (5) and (6). At step 108 the peaks of the coherence measure within the band are found, e.g., in accordance with the procedure discussed in connection with expressions (7)–(10), and at step 110, for each of the peaks found in step 108, the process finds and stores the energy time of arrival $T_e$, the slowness D, the coherence measure and the coherent energy. At step 112 a test is made to determine if the last depth level in the borehole depth interval of interest was just treated and, in case of a negative result, the depth index is incremented at step 114, and the process returns to step 106 to start on another depth level. A positive result at step 112 means that all depth levels of interest have been processed, and at step 116 a tangible representation of the relevant subsurface parameter(s) can be produced, e.g., by producing: (1) logs of the number of peaks found per depth level, (2) the slowness/time coherence log discussed above, (3) the differential time-of-arrival log discussed above, (4) the energy attenuation log discussed above and, possibly, (5) the Poisson ratio log, and/or (6) other tangible records of relevant subsurface parameters. These records are stored, such as by storing physical signals representative of the relevant log or other subsurface parameters in magnetic memory devices or in semiconductor memory circuits or other memory devices and/or by printing or otherwise recording visible traces and/or symbols on record media.

Referring to FIG. 6 for greater detail of the process for finding the coherence measure at the relevant points of a map such as that illustrated in FIG. 4, the process starts with the entry into step 106 in FIG. 5 and at steps 120 and 121 sets D and T to identify an initial point, at the lower left corner of the band discussed in connection with expression (6). Specifically, D is set to DMIN, which is the lowest value of interest, e.g., 40 microsec/ft, and T is set to the value found by the expression shown at step 121, using therein the current D value. At step 122 the coherent energy and the total energy for the map point identified by the current (T,D) coordinates are found, e.g., in accordance with the processes discussed in connection with expressions (4) and (5), and at step 124 the corresponding coherent energy measure is found, e.g., in accordance with the process discussed in connection with expression (3), and is suitably stored. At step 126 the current time coordinate is incremented by an increment a, which can take a selected value determined by the desired search resolution. For example, increment a may take a value in the range of 10 to 100 microseconds. At step 128 a test is made to determine if the incrementing at step 126 has pushed the time coordinate outside the band discussed in connection with expresion (6) and, if the result of the test is negative, the process returns to step 122. If the time coordinate incremented at step 126 has been pushed outside the permissible band, the process goes to step 130, to increment the current slowness coordinate by an increment b which again can be selected based on the desired resolution and can be, e.g., one microsec/ft. A test is made at step 132 to determine if the incrementing at step 130 has pushed the slowness coordinate above the maximum slowness (e.g., 190 or 250 microsec/ft) to be considered in the map and, if the result of the test is negative, the process returns to step 121, to start again at the left margin of the band discussed in connection with expression (6). In case of a positive result from the test at step 132 the process goes to step 140, FIG. 7, to commence a search for peaks of the coherence measure.

Figure 7:
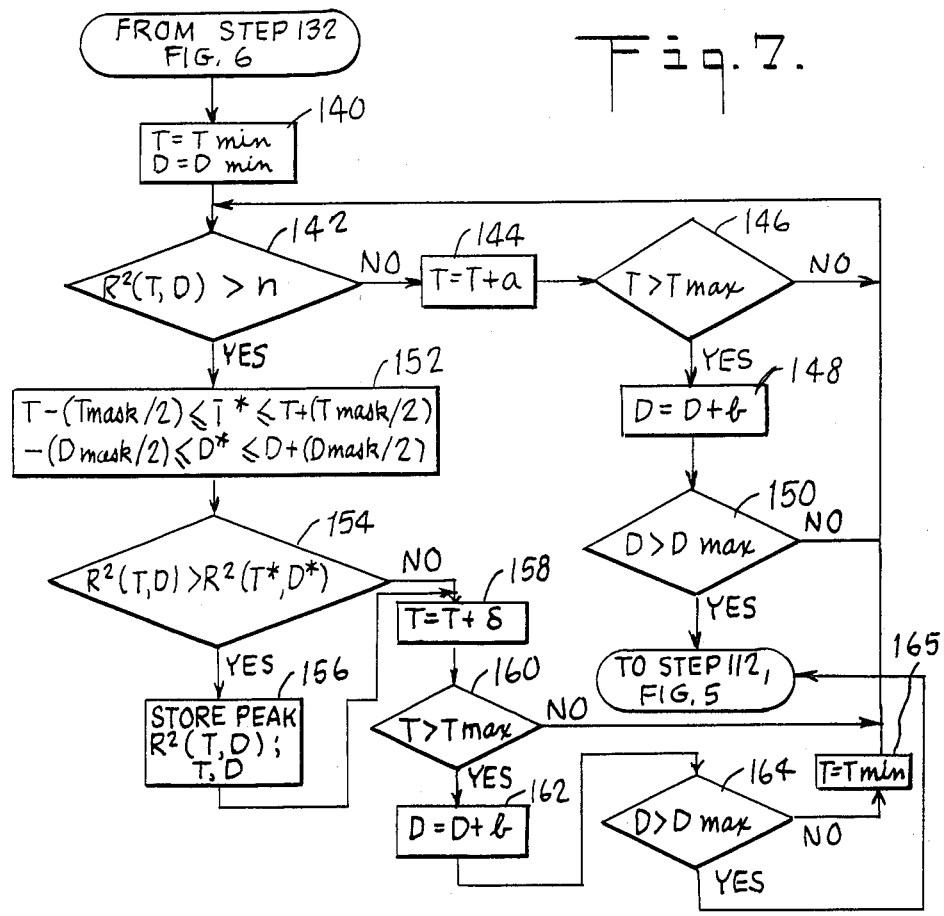
FIG. 7 is a more detailed flow chart of the process for finding peaks of the coherence measure.

Referring to FIG. 7, the process of finding coherence measure peaks starts at step 140 by setting the time and slowness coordinate to the lower left-hand corner of the band discussed in connection with expression (6), and at step 142 determines if the coherence measure found for the map point currently under consideration at step 124 exceeds a threshold level n. In case of a negative result, the current time coordinate is incremented at step 144, and a test is made at step 146 (using the relevant part of expression (6)) to determine if the incrementing at step 144 has pushed the current time coordinate outside the righthand margin of the band discussed in connection with expression (6). If the result of the test is negative, the process returns to step 142. In case of a positive result from the test at step 146, the current slowness coordinate is incremented at step 148, and a test is made at step 150 to determine if the incrementing has pushed the slowness coordinate outside the top slowness margin of the band. In case of a negative result the process returns to step 142. In case of a positive result, the process goes to step 112 of FIG. 5 so as to proceed to the next depth level up the borehole.

In case of a positive result from the test at step 142, meaning that the current map point under consideration has a coherence measure which exceeds the threshold, the process defines at step 152 a mask containing map points at (T*,D*) and centered at the map point under consideration, e.g., as discussed in connection with expressions (7) and (8) above, and at step 154 tests the coherence measure of the current map point under consideration against the coherence measures for all of the other map points within the mask. In some cases points (T*D*) within the peak mask will be outside the band in the slowness-time plane over which $R^2(T*D*)$ is found; in such case $R^2(T*D*)$ is taken to be zero. If the test at step 154 determines that the coherence measure at the current map point indeed exceeds the coherence measure for all other points within the mask, the map point of interest is stored at step 156 as a peak, together with its time and slowness coordinates, and the process goes to step 158. If the test at step 154 determines that that is not the case, the time coordinate is incremented at step 158 to identify the next map point to the right of the one previously considered, a test is made at step 160 to determine if this has pushed the time coordinate outside the righthand margin of the band discussed in connection with expression (6) and, if the result is negative, the process returns to step 142. Otherwise, the slowness coordinate is incremented at step 162, a test is made at step 164 to determine if this has pushed the current slowness coordinate above the top margin of the band discussed in connection with expression (6) and, if the test result is negative, the process sets at step 165 the time coordinate to the lefthand margin of the band discussed in connection with expression (6) and again returns to step 142. A positive test result at step 164 indicates that all necessary peak finding steps have been carried out for the depth level of interest, and the process returns to step 112 of FIG. 5.

Figure 8:
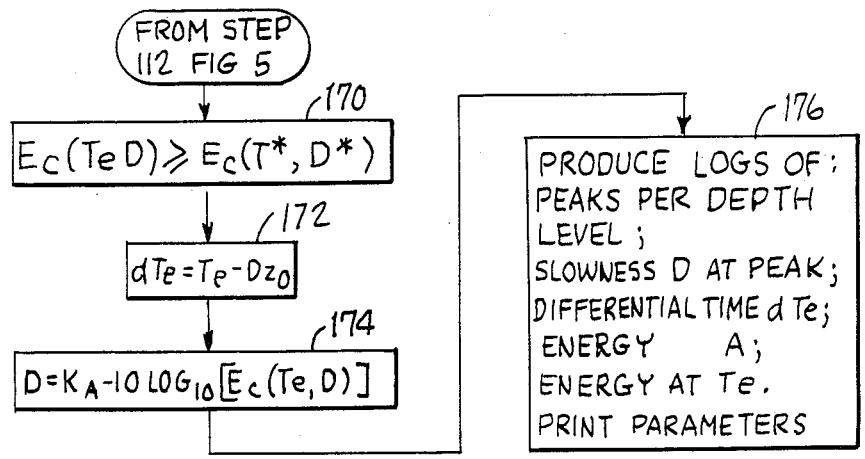
FIG. 8 is a more detailed flow chart relating to finding peak parameters and logging same.

Step 116 of FIG. 5 is shown in greater detail in FIG. 8, and involves finding, at step 170, the coherent energy of arrival associated with each peak, e.g, in accordance with the process discussed in connection with expression (11); finding at step 172 the differential time of arrival, e.g., in accordance with the process discussed in connection with expression (12); and finding at step 174 the "attenuation" measure, e.g., in accordance with the process discussed in connection with expression (13). The logs produced at step 176 are those discussed in connection with FIG. 116.

Figure 9:
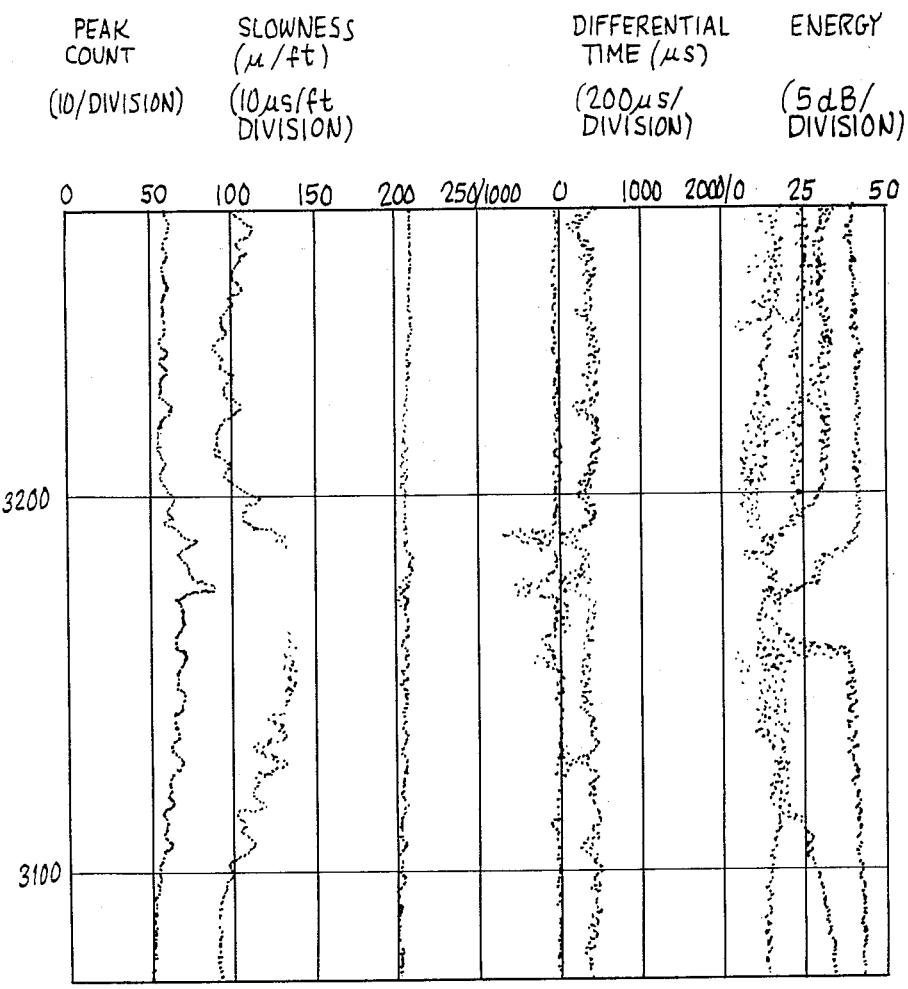
FIG. 9 is an exemplary set of new logs produced in accordance with the invention from original sonic logs taken in an open borehole.

One example of logs produced in accordance with the invention is illustrated in FIG. 9 and is based on actual sonic logs derived from a 12-receiver tool in an open borehole. The vertical scale is depth in the borehole. The leftmost log, at around the zero microsec/ft division, is indicative of the number of peaks found at the relevant borehole depth level and is on a scale of ten peaks per horizontal chart division. It is a measure of the quality of the outputs of the sonic log receivers 10a–10n, in that too many peaks for a given depth level suggest problems such as noisy measurements and too few suggest problems such as not enough coherent arrivals due to, for example, a stack of very thin beds. The log starting at about 60 microsec/ft is the slowness-time coherence log for the compressional waves; the log starting at about 90 microsec/ft is the slowness-time coherence log for the shear wave; and the log starting at about 210 microsec/ft is the slowness-time coherence log for the Stoneley return. To the right of this is a log of the differential time, and to the right of that is the log of the energy or "attenuation" measure for the respective slowness logs on the left of the chart presentation.

Figure 10:
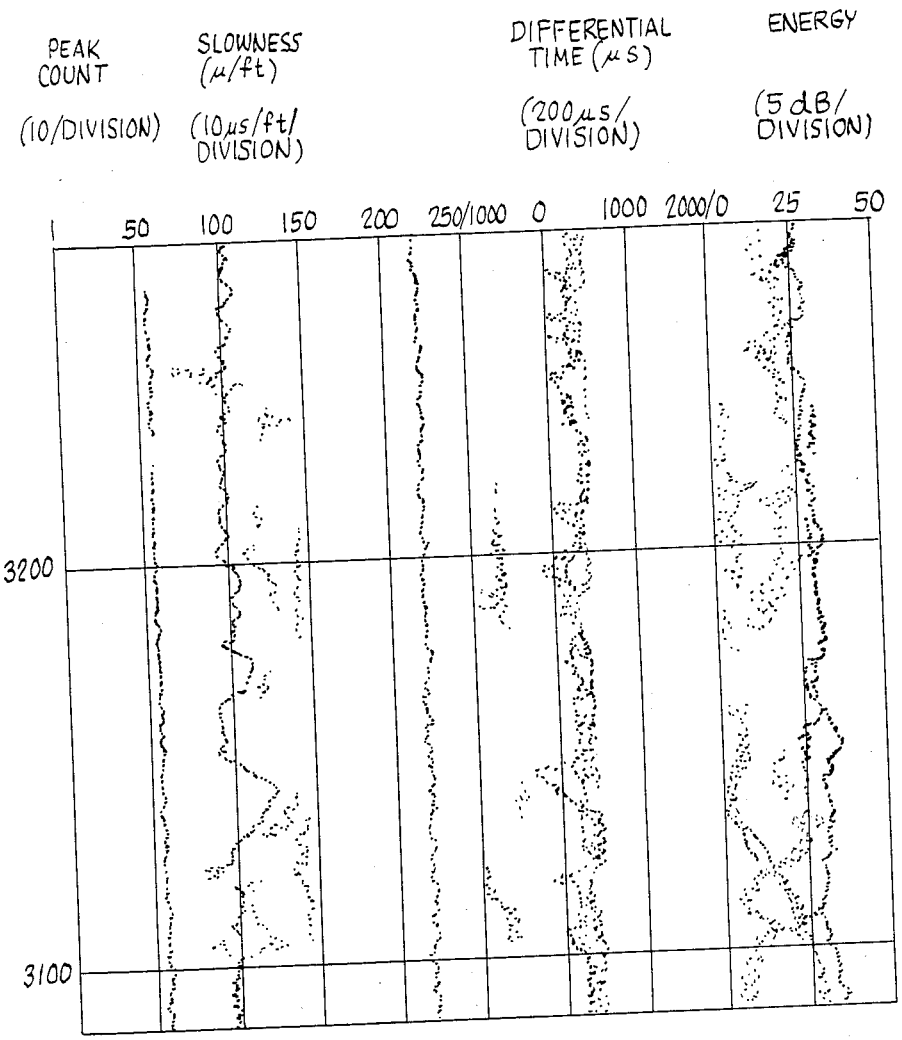
FIG. 10 is a new set of logs produced in accordance with the invention from original sonic logs taken in a cased borehole.

FIG. 10 illustrates a portion of a corresponding log presentation for a cased borehole, also derived from actual logs taken in a cased borehole with a 12-receiver tool. The log at about 57 microsec/ft is due to the plate mode wave for the steel casing.

Figure 11:
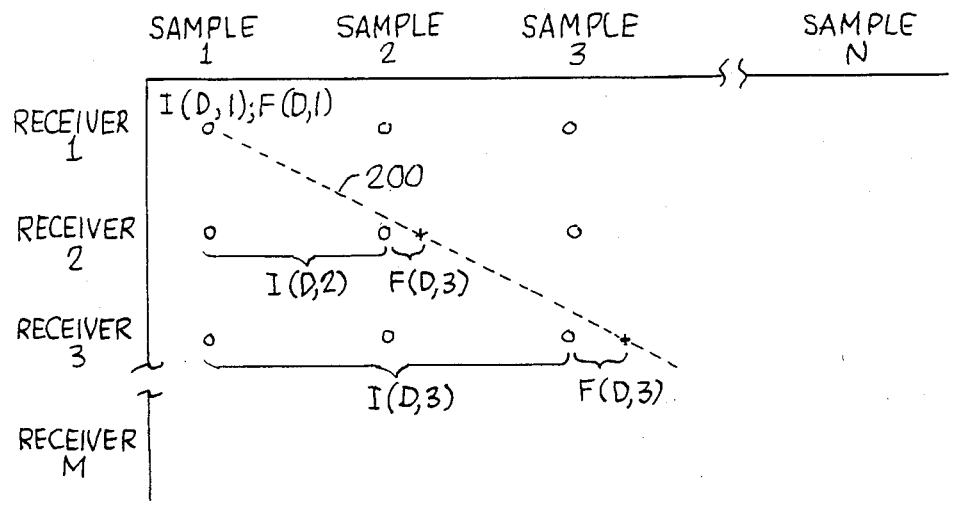
FIG. 11 illustrates storage of sonic receiver samples in a functionally two-dimensional array and an interpolation technique.

An important ingredient in implementing the invention is a the discovery of a particularly effective way of interpolating between samples from the sonic receivers so as to find the coherent and total energies for a given slowness, e.g., in carrying out a process corresponding to that defined by expressions (4) and (5) above. To this end, the sonic receivers are sampled at regular time intervals, e.g., every 10 microseconds, and the resulting digital samples are stored in a manner which is functionally equivalent to storing them in a rectangular array in which each row corresponds to a different receiver and each column corresponds to a different sample (i.e. to a different time). In this example, array position 1, 1 stores the digital sample derived at a given time from receiver 1 and array position 3, 2 stores the digital sample derived 20 microseconds later from receiver 2. A graphic illustration of such a functional array is shown in FIG. 11. Referring thereto, suppose that a given slowness is represented by the broken line 200 and the amplitude of each receiver output must be found for the times represented by where line 200 intersects the row corresponding to that receiver. As seen in FIG. 11, such time can be represented as the sum of an integer portion designated I and a fraction portion designated F. These integer and fraction portions can be derived simply by dividing the required time for a given receiver by the sample interval, i.e. by 10 microseconds in this example. Then the required interpolted sample $\hat{S}$ can be found by using the sample value S(k) whose location in storage is identified by the integer I and which is to the left of where line 200 intersects the row for the receiver, and the sample value S(k+1) to the right thereof in accordance with the following expression 14, where k is an index designating the sample address location.

$$\hat{S} = (1-F)S(k) + FS(k+1) \quad (14)$$

In the example of FIG. 11 the needed interpolated sample for receiver 2 is so derived from samples 2 and 3 and in the case of receiver 3, from samples 3 and 4. It is noted that the process can start with the first sample point from receiver number 1, which can be chosen as being at 0 time, and that for any given slowness the integers I and fractions F can be found for each individual remaining receiver, and that the same I and F values remain true for any other interpolated samples needed for the same slowness, whereby the process is considerably speeded and made more practical.

It has been found in practicing this invention that arriving at interpolated sample values as discussed above gives adequate results when the receiver outputs are sampled at about each 36° or less of the sonic signal waveform generated by the transmitter. For example, if transmitted sonic signal is at 10 KHz then said interpolation retains the accuracy of the ultimate results when the receiver outputs are sampled at about 100 KHz or more. It has been discovered however that where the sampling rate is not of this order, e.g. when the sampling rate is, say, 40 KHz, satisfactory accuracy of the ultimate results is retained by using a band limited interpolator to simulate sufficiently high sampling rate, e.g. a sampling rate of 160 KHz. To do this the measurements sampled in time are Fast Fourier transformed, e.g. by a dedicated array processor, such that a set of, say, 256 samples in time is converted to a set of 128 complex points in Fourier space. Thereafter 384 complex zeros are added to the set of 128 complex samples to arrive at a set of 512 complex samples. Those 512 complex samples in Fourier space are then subjected to inverse Fast Fourier transformation, by the same array processor, to derive therefrom a set of 1,024 samples in time, and then the interpolation discussed above is carried on the so expanded set of samples for individual receivers.

Another technique which has been found to speed up the above-described process and make it more practical is the use of a sliding time window to find the sum of the samples within a particular time span, e.g. in connection with the process described by expression (4) above. To this end sums are formed of the samples (interpolated as described above as needed) from all of the receivers for given times. For example let E(1) designate the sum of the samples from all receivers for a given time, let E(2) designate the sum of the samples from all receivers for that same time plus an increment, let E(3) designate the sum for that same time plus twice the increment, etc. Then store new values designted E' where E'(1) equals E(1), E'(2) equals E'(1)+E(2), E'(3) equals E'(2)+E(3), etc. Then, for any given time window for which the sum of all samples may be needed, e.g. in connection with the process described by expression (4) above, e.g., if the sum is required for the time window between the times corresponding to E(2) and E(51), the sum is derived simply by subtracting E'(1) from E'(51).

Yet another technique discovered to assist in speeding up the invented process and make it more practical is used in the peak search and involves first testing the coherence measure at a given T,D point (see expression (10)) against the coherence measures for the immediately adjacent points in the T*,D* mask and, if needed, expanding the search in larger concentric squares. It has been found that searching in this pattern is most likely to lead to rejection of false peaks early in the process.

While slowness-versus-time is the preferred combination for creating plots such as shown in FIG. 4, or at least the functional equivalent thereof, it is noted that the principles of the invention can be used to advantage in replacing slowness with sonic velocity. It is also noted that other modifications and variations which embody the invention disclosed herein will occur to those skilled in the art upon becoming familiar with the dscription herein, and that therefore the scope of the invention is limited only by the appended claims and not by the specific exemplary embodiments discussed in detail above. As a nonlimiting example of variations and modifications, rather than finding all of the peaks in a plot such as in FIG. 4, or in the functional equivalent thereof, it is possible to find only the compressional wave arrival peak and then assume that the shear energy arrival should be about forty percent higher in slowness and either rely totally on the assumption or use the assumption to limit the search for the shear arrival peak. An assumption can also be made that the Stoneley arrival is the highest peak at the upper right-hand corner of a plot such as in FIG. 4, or the equivalent thereof, and this assumption can be used to limit the search therefor. As yet another modification, the time window band discussed above can be made to depend on slowness, in which case it would not be a straight band extending diagonally across a plot such as in FIG. 4, or the functional equivalent thereof, but would be a curved band having at least one curvature. As yet another nonlimiting modification, a tapered rather than a rectangular time window can be used. In addition, it should be understood that the coherence measure discussed above can be found in other, equivalent ways, e.g., by processing in the frequency domain rather than by the time domain processing as in the example discussed in detail above.

What is claimed is:

1. A well logging method comprising:
    deriving logs of the respective receiver outputs of a multi-receiver sonic tool for a selected borehole interval;
    stacking moveout-corrected receiver outputs by depth level and identifying selected peaks of a coherence measure of the result without reliance on first motion detection; and
    producing logs of sonic properties of the formations versus borehole depth on the basis of selected parameters of said peaks.

2. A method as in claim 1 in which the stacking step comprises deriving a coherence measure based on the ratio of coherent to total energy in the moveout-corrected receiver outputs, or in signals derived as a function of said outputs, and the identifying step comprises identifying peaks in the coherence measure by depth level.

3. A method as in claim 2 in which the logs include logs of compressional and shear slowness or velocity based on the peaks within selected bands in time and velocity or slowness.

4. A method as in claim 3 in which the same stacking and identifying steps are applied to receiver outputs from both cased and uncased boreholes.

5. A method as in claim 1 in which the stacking step comprises finding for each depth level in the borehole a coherence measure for each of a number of selected combinations of time and slowness or velocity inclued in the moveout-corrected receiver outputs in a selected band of time and slowness or velocity, wherein said band is selected to correspond to the velocity or slowness range likely to be encountered in the formations surrounding the borehole, and in which the identifying step comprises identifying peaks of the coherence measure for each depth level.

6. A method as in claim 5 including finding and storing for each peak the corresponding slowness or velocity and in which the log producing step comprises producing a log of the slowness or velocity associated with each of up to a selected number of peaks per depth level.

7. A method as in claim 1 including finding and storing for each peak a set of parameters comprising the energy time of arrival, the compressional and shear slowness or velocity, the coherence measure and the coherent energy, and the log producing step comprisess producing logs of selected ones of the stored parameters versus depth in the borehole.

8. A well logging method comprising the following machine-implemented steps:
    deriving sonic logs as respective functions of the receipt of sonic signals by sonic receivers which are carried by a tool moved through successive depth levels in a borehole and are spaced along the length of the tool from each other and from at least one transmitter of said signals carried by the same tool;
    converting the sonic logs into a slowness log which varies with depth in the borehole as a function of a coherence measure related to the ratio of moveout-corrected coherent to total energy received by the respective receivers; and
    producing a tangible representation of said slowness log.

9. A well logging method as in claim 8 in which the spacing between sonic receivers along the length of the borehole tool is less than one foot.

10. A well logging method as in claim 9 in which said spacing is approximately half a foot.

11. A well logging method as in claim 8 in which the spacing between sonic receivers along the length of the borehole tool is less than half a wavelength of said sonic signals.

12. A well logging method as in claim 8 in which the converting step comprises finding, at each of said depth levels, the coherence measure for only those responses of said sonic receivers which are within a selected band of permissible time and slowness and finding the peaks only for the coherence measures consistent with said selected band.

13. A well logging method as in claim 12 in which the step of finding peaks of the coherence measure comprises selecting as a peak only a coherence measure which exceeds a selected level and additionally exceeds all other coherence measures found on the basis of time and slowness responses within a selected mask thereof.

14. A well logging method as in claim 8 including finding the times of arrival of the respective maximum coherent energies associated with respective peaks of the coherence measure and producing a tangible representation of a parameter of said energies for the respective peals of the coherence measure at the respective depth levels.

15. A well logging method as in claim 14 in which the parameter of said times of arrival is the differential time between a respective time of arrival and a time based on the measured slowness of that arrival and the transmitter-receiver distance along the tool.

16. A well logging method as in claim 8 including finding the coherent energy of said sonic logs for the respective peaks of the coherence measure at the respective depth levels and producing a tangible representation of a parameter thereof.

17. A well logging method as in claim 16 in which said parameter of the coherent energy for a peak is a measure of the attenuation suffered by the sonic energy in travelling from the transmitter to the receivers.

18. A well logging method as in claim 8 in which said oen or more tangible representations comprise visible log traces plotted on a record medium as signal levels versus borehole depth.

19. A well logging method comprising the following machine-implemented steps;
passing a multi-receiver sonic tool through a borehole to derive therefrom sonic logs as respective functions of the receipt of sonic signals by receivers which are spaced along the length of the tool from each other and from at least one transmitter of said signals carried by the tool;
converting the sonic logs into a slowness log which varies with depth in the borehole as a function of the respective peaks of a coherence measure of the energies in said sonic logs which does not rely on first motion detection; and
producing a tangible representation of said slowness log.

20. A well logging method as in claim 19 including finding additional characteristics of said peaks of the coherence measure and producing a tangible representation of said additional chracteristics.

21. A well logging method as in claim 20 in which the tangible representations of said slowness log and additional characteristics of said peaks comprise respective visible log traces plotted on a record medium as signal levels versus borehole depth.

22. A well logging system comprising:
means for deriving sonic logs of the receipt of sonic signals by sonic receivers which are carried by a tool moved through successive depth levels in a borehole and are spaced along the length of the tool from each other and from at least one transmitter of said signals carried by the same tool; and
means for converting the sonic logs into a slowness log which varies with depth in the borehole as a function of a distribution of a coherence measure of the energies in said sonic logs but does not rely on first motion detection and for producing a tangible representation of said slowness log.

23. A well logging system as in claim 22 in which said tangible representation comprises a visible trace on a record medium of said slowness log versus depth in the borehole.

24. A well logging system as in claim 22 in which the means for deriving sonic logs include at least one sonic tool passing through a borehole traversing earth formations.

25. A well logging method comprising:
deriving sonic logs based on sonic signals received by sonic receivers which are carried by a tool moved through successive depth levels in a borehole and are spaced along the length of the tool from each other and from at least one transmitter of said signals carried by the same tools;
seeking for each depth level at least one peak of a coherence measure of the energies in said sonic logs which is different from the results of correlation of cross-products, and identifying any found peak as corresponding to a respective compressional or other sonic wave component; and
producing a tangible representation of a selected parameter corresponding to said peak versus depth in the borehole to thereby produce a new log.

26. A method as in claim 25 including the step of converting said sonic logs into a slowness-versus-time plot at each of a succession of borehole depth levels and including the step of locating said peak in each respective plot.

27. A well logging system comprising:
means for deriving sonic logs of the receipt, at successive borehole depth levels, of sonic signals by sonic receivers which are spaced from each other along the borehole but are at respective fixed distances to an origin of the sonic signals; and
means for finding for each respective borehole depth at least one peak of a coherence measure of the energies in said sonic logs which is different from the results of correlation or cross-products and for producing a tangible representation of selected parameters of said peaks.

28. A well logging system as in claim 27 in which said tangible representation comprises a visible log trace of said parameters on a record medium.

29. A well logging method comprising the following machine-implemented steps:
deriving logs of the sonic energy received at sonic receivers spaced from each other and from a sonic transmitter along a tool moved through a borehole;
for each of a succession of selected depths in the borehole, and for each of a multiplicity of time-slowness or time-velocity combinations which form a grid in time-slowness or time-velocity space, finding a measure of the coherent energy received by said receivers;
for each of said depths, finding any peaks of said measure of energy which meet selected criteria; and
producing a tangible representation of the variation with borehole depth of selected borehole characteristics related to said peaks.

30. A method as in claim 29 in which each of said measures of energy is dimensionless and is normalized to range in value from zero to unity.

31. A method as in claim 29 in which said measure of energy is found in the same manner for both cased and uncased boreholes.

32. A method as in claim 29 in which said measure of energy is the coherence or semblance of the sonic energy logs corrected for moveout.

33. A well logging method comprising:
deriving respective logs of the outputs of acoustic receivers spaced from each other and from an acoustic transmitter along a tool moved through a borehole;
for each of a succession of depth levels in the borehole, selecting a multiplicity of pairs of values of (i) time and (ii) an acoustic characteristic of the medium through which acoustic signals propagate from the transmitter to the respective receivers for the respective depth level in the borehole, and for each pair combining with each other the logged portions of the respective receiver outputs which correspond to said pair of values to derive a respective combined measure, and finding any pairs of values at which said measure is at a peak meeting selected criteria of a coherence measure; and producing a tangible representation of the variation with borehole depth of one or more selected borehole characteristics which correspond to said peaks.

34. A method as in claim 33 in which said combined measure is a measure of the coherent energy received by the receivers after moveout correction.

35. A method as in claim 34 in which said measure is a function of the ratio of coherent to total energy.

36. A method as in claim 35 in which said measure is normalized and dimensionless.

37. A well logging method comprising:

producing logs of the respective acoustic signals detected at receivers spaced from each other and from an acoustic transducer along a tool moved through a borehole;

combining the logs, with moveout correction but without first motion detection, to produce a processed log of the variation with depth in the borehole of the acoustic velocity or slowness of the surrounding medium as determined by selected peaks of a coherent measure and producing a tangible representation of said processed log.

38. A method as in claim 37 in which said combinating step is the same for both cased and uncased boreholes.

39. A method as in claim 38 in which said combining step comprises selecting, for each of a succession of depth levels in the borehole, a multiplicity of pairs of values of time and acoustic velocity or slowness, which pairs form a selected array in time-velocity or time-slowness space, and for each pair of values combining with each other the portions of said receiver output logs which correspond to the values in the pair, to derive a respective combined measure, and finding any pairs of values at which said measure is at a peak meeting selected criteria, and producing the processed log as a function of at least one of the values corresponding to said peaks.

* * * * *

UNITED STATES PATENT AND TRADEMARK OFFICE
CERTIFICATE OF CORRECTION

PATENT NO. : 4,594,691

DATED : June 10, 1986

INVENTOR(S) : Christopher V. Kimball & Thomas L. Marzetta

It is certified that error appears in the above-identified patent and that said Letters Patent is hereby corrected as shown below:

In column 7, equation (4) should read:

$$--E_c (T, D) = \int_0^{T_w} \left| \sum_{i=0}^{M-1} s(i, t + [T+D(z_i - z_0)]) \right|^2 dt \quad (4) --$$

In column 7, equation (5) should read:

$$--E (T, D) = \int_0^{T_w} \sum_{i=0}^{M-1} \left| s(i, t + [T+D(z_i - z_0)]) \right|^2 dt \quad (5) --$$

Signed and Sealed this

Third Day of November, 1987

*Attest:*

DONALD J. QUIGG

*Attesting Officer*  *Commissioner of Patents and Trademarks*